US008121075B2

(12) United States Patent  (10) Patent No.: US 8,121,075 B2
Zhang et al.  (45) Date of Patent: Feb. 21, 2012

(54) BASE STATION AND SCHEDULING METHOD USED IN BASE STATION

(75) Inventors: Yuantao Zhang, Beijing (CN); Hua Zhou, Beijing (CN)

(73) Assignee: Fujitsu Limited, Kawasaki (JP)

( * ) Notice: Subject to any disclaimer, the term of this patent is extended or adjusted under 35 U.S.C. 154(b) by 562 days.

(21) Appl. No.: 12/285,548

(22) Filed: Oct. 8, 2008

(65) Prior Publication Data

US 2009/0196224 A1  Aug. 6, 2009

(30) Foreign Application Priority Data

Jan. 31, 2008 (CN) .......................... 2008 1 0008955

(51) Int. Cl.
 *H04W 4/00* (2009.01)
(52) U.S. Cl. ....................................................... 370/328
(58) Field of Classification Search ........................ None
 See application file for complete search history.

(56) References Cited

U.S. PATENT DOCUMENTS

| 2005/0032521 | A1 | 2/2005 | Lee | |
|---|---|---|---|---|
| 2005/0286663 | A1 | 12/2005 | Poon | |
| 2008/0268862 | A1* | 10/2008 | Kent et al. | 455/452.2 |
| 2008/0298482 | A1* | 12/2008 | Rensburg et al. | 375/260 |
| 2009/0046569 | A1* | 2/2009 | Chen et al. | 370/203 |
| 2011/0085588 | A1* | 4/2011 | Zhuang et al. | 375/219 |

FOREIGN PATENT DOCUMENTS

| CN | 1592144 A | 3/2005 |
|---|---|---|
| CN | 1973473 A | 5/2007 |

OTHER PUBLICATIONS

First Notification of Office Action dated Jul. 19, 2011 received in corresponding Chinese Patent Application No. 200810008955.6.

* cited by examiner

*Primary Examiner* — Chirag Shah
*Assistant Examiner* — Otis L Thompson, Jr
(74) *Attorney, Agent, or Firm* — Murphy & King, P.C.

(57) ABSTRACT

Disclosed in the present invention are base stations and scheduling methods used in base stations. The base station uses a multi-user multi-input and multi-output method, including: storing codebook vector group information relevant to a combination of codebook vectors capable of being used as a pre-coding group, the codebook vector group information comprising an index of the combination of codebook vectors capable of being used as a pre-coding group; selecting codebook vectors to be taken as elements of a pre-coding matrix; determining an index, to which a combination of the codebook vectors selected by a pre-coding matrix element corresponds, in accordance with the codebook vectors to be taken as elements of a pre-coding matrix as selected by the pre-coding matrix element and with reference to the codebook vector group information; and transmitting the index of the combination of the codebook vectors.

10 Claims, 4 Drawing Sheets

BASE STATION AND SCHEDULING METHOD USED IN BASE STATION

FIELD OF THE INVENTION

The present invention relates to a multi-user MIMO (multiple input multiple output) system in wireless communications.

BACKGROUND OF THE RELATED ARTS

Figure 1:
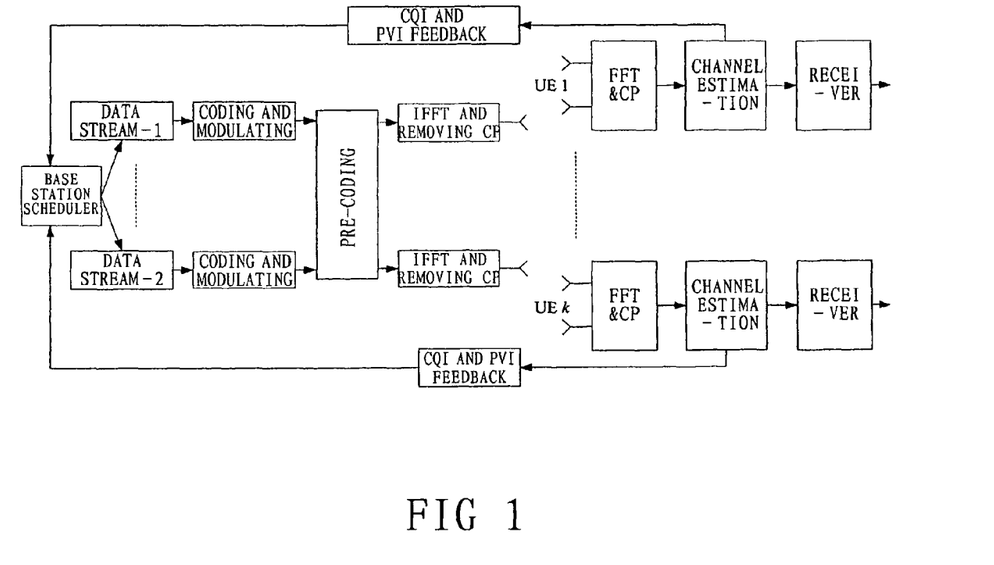
FIG. 1 illustrates the structure of a zero-forcing multi-user MIMO system according to the prior art.

The multi-user MIMO system is a closed loop MIMO solution, in which the base station schedules in accordance with channel information fed back from each mobile station to enable a plurality of users to simultaneously transmit data on a plurality of antennas within the same time and frequency resource, with each user occupying one or more data streams. Since signals of a plurality of users are transmitted simultaneously within the same time and frequency resource, it is necessary for the scheduled user to separate the data streams of his own. Separation of data streams can be done at the user terminal or pre-separated at the base station terminal. The former method is referred to as unitary pre-coding, while the latter method is called zero-forcing pre-coding. This paper mainly concentrates on the multi-user MIMO solution employing zero-forcing pre-coding, whose typical structure is shown in FIG. 1. The processing procedure is as follows:

1) User terminal UE (such as UE 1 ... UE n) performs channel estimation to obtain a channel matrix H, whose reception vector $v_1$ is calculated to obtain an effective channel vector $h_{\textit{eff}}$, represented as: $h_{\textit{eff}} = v_1 H$. Singular value decomposition is performed thereon to obtain $H = U\Sigma T^H$, where U and T are unitary matrixes and $\Sigma$ is a diagonal matrix. The reception vector $v_1 = u_1^H$, namely the conjugate transpose of the first column vector of the matrix U.

2) The base station and the user terminal hold the same codebook; suppose a vector set contained in the codebook be $S = \{s_1, s_2, \ldots, s_N\}$, the effective channel vector $h_{\textit{eff}}$ is quantized by using the vectors in the codebook to obtain $h = s_i$, $$i = \arg\max_{1 \le j \le N} |\langle h_{\textit{eff}}, s_j \rangle|,$$

where h is the quantized channel vector, and where $\langle h_{\textit{eff}}, s_j \rangle$ denotes the inner product between vectors $h_{\textit{eff}}$ and $s_j$.

3) Calculate CQI value, and feed back CQI and index i of the quantized vector $s_i$ as selected to BS.

4) BS terminal scheduler (base station scheduler) determines a user group in accordance with a scheduling algorithm, and a matrix C is constructed in accordance with vector indexes fed back from each user of the user group. A transformation matrix with the pre-coding matrix as the matrix C is represented as: $G = C(CC^H)^{-1}$.

Due to the quantization of the effective channel and other factors such as feedback delay, the zero-forcing pre-coding solution cannot achieve perfect separation of data streams transmitted from each scheduled user. If the base station terminal transmits a zero-forcing pre-coding matrix to each scheduled user, it will be possible for the user terminal to perform mean square error estimation MMSE by using the pre-coding matrix known in advance to further reduce interference between multiple users (refer for this method to 3GPP R1-070346, Philips, "Comparison of MU-MIMO feedback schemes with multiple UE receive antennas"). Since wireless frequency spectrum is very costly, the base station has to reduce the downlink signaling overhead to save bandwidth occupied by the downlink as much as possible while notifying the user of the pre-coding matrix used.

Two existent methods for transmitting the pre-coding matrix are described below. Taking an example where the base station terminal uses 4 emission antennas, the maximum number of users capable of being scheduled is four, namely, the number of users capable of being simultaneously scheduled can be two, three or four. Accordingly, in order to search a user combination having the maximum data rate, the optimal number of user combinations selected is in principle:

$$N = \sum_{i=2}^{4} \binom{K}{i} = C_K^2 + C_K^3 + C_K^4,$$

where K indicates the number of vectors in the codebook. Taking for example a 4-bits Grassmannian codebook that contains 16 vectors, the signaling overhead required for the base station to notify the scheduled user are $\log_2 N = \lceil \log_2 2500 \rceil = 12$ bits. As can be seen, such user selection solution requires too large a number of user groups to be selected as well as requires high complexity. Another method can be referred to in the method proposed in 3GPP R1-072514, Freescale Semiconductor Inc, "Codebook Design for MU-MIMO". Taking also for example the 4-bits Grassmannian codebook, if four users are simultaneously scheduled, the signaling overhead should firstly include the number of simultaneously scheduled users, which requires 2 bits, and should then notify the index of each vector in the pre-coding matrix, which requires 4 bits for each vector, so that it requires 16 bits to transmit the pre-coding matrix. That is to say, the downlink requires 18 bits altogether. In addition, since it is necessary for downlink control signaling to employ low coding rate and low modulation mode, the total signaling overhead of the aforementioned two methods requires relatively more data symbols.

SUMMARY OF THE INVENTION

The present invention is proposed in view of the aforementioned problems to provide a multi-user MIMO base station and a method used in the base station. The apparatus and method can solve or alleviate one or more problems existent in the state of the art, and provide at least one advantageous choice.

The present application provides the following inventions:

Invention 1: a base station employing a multi-user multi-input and multi-output (MIMO) method, characterized in that the multi-user multi-input and multi-output base station comprises:

a storing means, for storing codebook vector group information relevant to a combination of codebook vectors capable of being used as a pre-coding group, the codebook vector group information comprising an index of the combination of codebook vectors capable of being used as a pre-coding group;

a pre-coding matrix element selecting means, for selecting codebook vectors to be taken as elements of a pre-coding matrix;

a pre-coding matrix index determining means, for determining an index, to which a combination of the codebook vectors selected by the pre-coding matrix element selecting means corresponds, in accordance with the codebook vectors to be taken as elements of a pre-coding matrix as selected by the pre-coding matrix element selecting means and with reference to the codebook vector group information; and a pre-coding matrix index transmitting means, for transmitting the index of the combination of the codebook vectors determined by the pre-coding matrix index determining means.

Invention 2: the base station according to Invention 1, characterized in that the codebook vector group information is a table, which correspondingly stores the combination of codebook vectors capable of being used as a pre-coding group and the index of the combination.

Invention 3: the base station according to Invention 1, characterized in that the codebook vector group information is an optional user group trellis, which comprises plural series of state transition information and indexes corresponding, respectively, to the state transition information of each series, the state transition information of each series including the combination of codebook vectors capable of being used as a pre-coding group.

Invention 4: the base station according to Invention 1, characterized in that the pre-coding matrix element selecting means determines the codebook vectors to be taken as elements of pre-coding matrix in accordance with the codebook vector group information.

Invention 5: the base station according to Invention 1, characterized in that the pre-coding matrix element selecting means determines the codebook vectors to be taken as elements of a pre-coding matrix in accordance with one of a maximum rate rule, a fairness rule, a proportion fairness scheduling rule, a grouping scheduling rule, and a polling scheduling rule.

Invention 6: the base station according to Invention 1, characterized in that the combination of codebook vectors capable of being used as a pre-coding group is a combination of two or more codebook vectors whose correlation value therebetween is lower than a predetermined threshold value.

Invention 7: the base station according to Invention 1, characterized in that the combination of codebook vectors capable of being used as a pre-coding group is a combination of two or more codebook vectors whose correlation value therebetween is lower than a predetermined threshold value and which cannot be further combined with other codebook vectors.

Invention 8: a scheduling method for use in a base station employing a multi-user multi-input and multi-output (MIMO) method, characterized in that the method comprises:
a pre-coding matrix element selecting step, for selecting codebook vectors to be taken as elements of a pre-coding matrix;
a pre-coding matrix index determining step, for determining an index, to which a combination of the codebook vectors selected in the pre-coding matrix element selecting step corresponds, in accordance with the codebook vectors be taken as elements of a pre-coding matrix as selected in the pre-coding matrix element selecting step and with reference to codebook vector group information, wherein the codebook vector group information is stored in a storing means of the multi-user MIMO base station, relates to the combination of the codebook vectors capable of being used as a pre-coding group, and includes the index of the combination of the codebook vectors capable of being used as a pre-coding group; and
a pre-coding matrix index transmitting step, for transmitting the index of the combination of the codebook vectors determined in the pre-coding matrix index determining step.

Invention 9: the method according to Invention 8, characterized in that the codebook vector group information is a table, which correspondingly stores the combination of codebook vectors capable of being used as a pre-coding group and the index of the combination.

Invention 10: the method according to Invention 8, characterized in that the codebook vector group information is an optional user group trellis, which comprises plural series of state transition information and indexes corresponding, respectively, to the state transition information of each series, the state transition information of each series including the combination of codebook vectors capable of being used as a pre-coding group.

Invention 11: the method according to Invention 8, characterized in that the pre-coding matrix element selecting step determines the codebook vectors to be taken as elements of a pre-coding matrix in accordance with the codebook vector group information.

Invention 12: the method according to Invention 8, characterized in that the pre-coding matrix element selecting step determines the codebook vectors to be taken as elements of a pre-coding matrix in accordance with one of a maximum rate rule, a fairness rule, a proportion fairness scheduling rule, a grouping scheduling rule, and a polling scheduling rule.

Invention 13: the method according to Invention 8, characterized in that the combination of codebook vectors capable of being used as a pre-coding group is a combination of two or more codebook vectors whose correlation value therebetween is lower than a predetermined threshold value.

Invention 14: the method according to Invention 8, characterized in that the combination of codebook vectors capable of being used as a pre-coding group is a combination of two or more codebook vectors whose correlation value therebetween is lower than a predetermined threshold value and which cannot be further combined with other codebook vectors.

Invention 15: a computer readable storage medium storing the codebook vector group information according to any one of Inventions 1 to 14; the storage medium can be a magnetic disk, a DVD, a CD, an MO, an ROM, an RAM and so on.

Invention 16: the base station according to Invention 1, characterized in that the codebook vector group information is a tree or a binary tree, whose nodes correspondingly store the combination of codebook vectors capable of being used as a pre-coding group and the index of the combination.

SPECIFIC EMBODIMENTS

Specific embodiments of the present invention are described in greater detail below with reference to the accompanying drawings.

The solution as proposed in the present invention is applicable to base station terminals having $N_t$ output antennas, and the number of users capable of being simultaneously scheduled thereby can be 2, . . . , N. Taking for example a Grassmannian codebook with $N_t$=4 and containing 16 vectors, its specific method for reducing the signaling overhead is as follows:

1) One set $S_n = \{s_{n,k_1}, s_{n,k_2}, \ldots, s_{n,k_N}\}$ is maintained for each vector $s_n (1 \leq n \leq 16)$ in the codebook; to avoid confusion, it should be noted that the $s_n$ in lowercase letters denotes the vectors in the codebook, whereas the capitalized $S_n$ denotes the set maintained for the vectors $s_n$. The following similar symbols denote the same meanings. $k_N$ denotes the number of vectors contained in the set. As should be noted, the vectors in this set correspond to the other vectors in the codebook, and preferably correspond to the vectors after vector $s_n$ in this codebook. For instance, the set $s_{1,k_1}$ to which vector $S_1$ corresponds is a certain one from $S_2$ to $S_{16}$. Moreover, a correlation value between each vector and $s_n$ in this set is smaller than a preset threshold T, namely, $|s_n^H s_{n,k_1}| \leq T$, $k_1 \leq k_1 \leq k_N$. Basis for such a deign method is the fact that, if the correlation value between any two vectors in the pre-coding matrix is relatively small, interference between data streams will be reduced.

Figure 2:
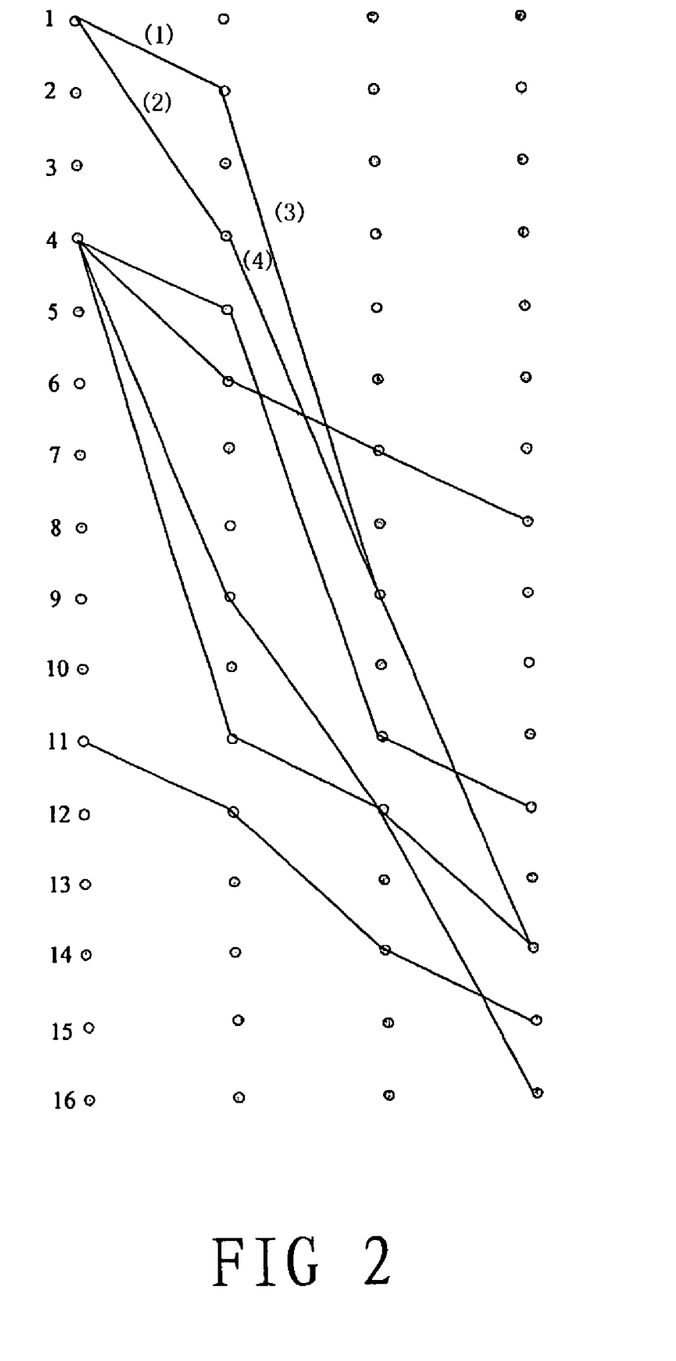
FIG. 2 illustrates a trellis according to one embodiment of the present invention.

2) A user group trellis is designed to determine all indexes of potentially selectable users, as shown in FIG. 2. The number of columns of this trellis is the same as the maximum number of users capable of being scheduled. The number of rows (number of states) is the number of vectors in the codebook. In the case where the base station employs four antennas and a Grassmannian codebook having 16 vectors, the trellis consists of 4 columns and 16 rows, and the 16 vectors in the codebook each represent one state in the trellis. The number of users contained in the selected user groups can be 2, 3 or 4. Each user group denotes a series of state transfers in the trellis, for instance, the primary state transfer (corresponding to the connection line between two states in the trellis) denotes that the user group contains two users, and the secondary state transfer denotes that the user group contains three users, etc.

3) One example is taken here to illustrate the state transfer process. Referring to FIG. 2, as regards the first state of the first column in the trellis, namely corresponding to vector 1 in the codebook, the state to which its next state transfer corresponds is the entire vectors in the set maintained for the vector 1 according to step 1), represented as $S_1 = \{s_{1,k_1}, s_{1,k_2}, \ldots, s_{1,k_N}\}$. As should be noted, since the entire vectors in this set are vectors selected from the codebook, each vector in this set separately is maintained its own set. Suppose the set maintained for the first vector $s_{1,k_1}$ be $S_{1,k_1}$ the transferred state $S_{1,2}$ to which the vector $s_{1,k_1}$ corresponds at the secondary state transfer is an intersection between sets $S_{1,k_1}$ and $S_1$, represented as $S_{1,2} = S_1 \cap S_{1,k_1}$.

For instance, if sets maintained with respect to the vector $s_1$ are $\{s_2, s_4, s_9\}$, sets maintained with respect to the vector $s_2$ are $\{s_6, s_9\}$, and sets maintained with respect to the vector $s_4$ are $\{s_5, s_6, s_9, s_{11}\}$, the first transfer for the vector $s_1$ can be to any one or more of the vectors $s_2, s_4, s_9$; when it is moved to the vector $s_2$, only the vector $s_9$ can be moved to at the second transfer, namely an intersection of the sets maintained with respect to the vector $s_1$ and the sets maintained with respect to the vector $s_2$.

It is obvious that if the index of a vector of the next state to which a certain state is transferred is designed to be larger than the index of the vector to which the current state corresponds, then redundant state transfers will be deduced, that is to say, indexes of the vectors in the set $S_{1,2}$ are all larger than the indexes of the vectors to which $s_{1,k_1}$ corresponds. This process also applies to the subsequent state transfers.

Thus, suppose that all sets of matrixes corresponding to the second state transfer, the third state transfer and the fourth state transfer be respectively represented as $P_2, P_3, P_4$.

After construction of this trellis, all state transfers as provided (namely each of the matrixes in $P_2, P_3, P_4$) are numbered together and each assigned with a unique index. The sets of vectors to which each index corresponds are stored in the memories of the base station and the user. When the base station selects a certain user group in accordance with the scheduling rule, the index to which the user group corresponds is transmitted to the downlink scheduled user via a control channel. Suppose the threshold T of the correlation value between the vectors equal 0.4, it is possible to calculate with regard to the Grassmannian codebook containing 16 vectors to obtain altogether 126 user groups that satisfy the condition, so that altogether $\lceil \log_2 126 \rceil = 7$ bits are required to notify the downlink scheduled user of the pre-coding matrix used.

As should be noted, the number of the obtained user groups is increased with the increase in the preset threshold and the increase in the maximum number of users capable of being scheduled. The preset threshold can be set as different values with regard to different numbers of scheduled users to balance the total number of state transfers.

In addition, it has been described above of using the trellis to generate all selectable user groups, but storage can be made by the method of tables or in the form of a tree or a binary tree during actual storage of the base station terminal and the user terminal. When representation is made by a binary tree or a tree, each node of the tree indicates each codebook vector capable of being combined. Representation can be made by one tree or a plurality of trees. For instance, as shown in Table 1 below is a feasible codebook vector combination information table.

TABLE 1

| Combination of Vectors | Number of Indexes |
|---|---|
| $s_1, s_2$ | 1 |
| $s_1, s_4$ | 2 |
| $s_1, s_2, s_9$ | 3 |
| $s_1, s_4, s_9$ | 4 |
| ... | |

Moreover, it is also possible to increase the number (amount) of the codebook vectors such as the fields for the base station to enhance the retrieval speed, as shown in Table 2 below.

TABLE 2

| Number of Vectors | Vector Combinations | Number of Indexes |
|---|---|---|
| 2 | $s_1, s_2$ | 1 |
| 2 | $s_1, s_4$ | 2 |
| 3 | $s_1, s_2, s_9$ | 3 |
| 3 | $s_1, s_4, s_9$ | 4 |
| ... | ... | |

Furthermore, it is possible to include such fields as the number of son combination indexes and/or the number of father combination indexes. The son combinations or father combinations of the combination are indicated, as shown in Table 3 below.

TABLE 3

| Number of Codebook Vectors | Codebook Vector Combinations | Number of Father Combination Indexes | Number of Indexes |
|---|---|---|---|
| 2 | $s_1, s_2$ | ... | 1 |
| 2 | $s_1, s_4$ | ... | 2 |
| 3 | $s_1, s_2, s_9$ | 1 | 3 |
| 3 | $s_1, s_4, s_9$ | 2 | 4 |
| ... | ... | ... | ... |

Alternatively, it is also possible not to store the son combinations. In other words, the combinations of two or more codebook vectors, whose correlation value therebetween is lower than a predetermined threshold value and which cannot be further combined with other codebook vectors, are stored only. For instance in the case of combinations where $S_1$, $S_2$ and $S_9$ are stored, the combination of $S_1$ and $S_2$ is not stored. This can further reduce the storage capacity and accelerate the retrieval speed.

Alternatively, storage can be made by using a plurality of tables. For instance, one table stores only the combinations of two codebook vectors, one table stores only the combinations of three codebook vectors, and one table stores only the combinations of two codebook vectors.

In this paper, according to the context, the combination of codebook vectors is also referred to as the matrix.

During use the aforementioned storage tables are stored in both the base station (transmitter device) and the mobile station (receiver device).

The present invention demands no restrictions to the scheduling method used by the base station. The base station can use any adequate method such as the maximum rate rule, the fairness rule, the proportion fairness scheduling rule, the grouping scheduling rule, and the polling scheduling rule.

The process performed in accordance with the aforementioned scheduling method is described below in the case the base station uses the maximum rate scheduling method. The method can include the following steps.

1) The base station searches whether there are four vectors fed back from the mobile station to compose a matrix contained in a matrix set $P_4$. This can for example be achieved by searching recordation with the number of codebook vectors being 4 in Table 3. Suppose there be $k_1$ number of such recordation, the combination of codebook vectors in the recordation is represented as matrixes $W_4 = \{W_{4,1}, W_{4,2}, \ldots, W_{4,k_1}\}$, wherein the index of the matrix that corresponds to the maximum SINR can be represented as $$n = \arg\max_{1 \le n_1 \le k_1} \{SINR_{n_1}\},$$

where $SINR_{n_1}$ is the summation value of SINR to which all vectors in the matrix $W_{4,n_1}$ correspond.

If other scheduling algorithms are used, it suffices to perform calculation of other corresponding parameters.

2) The base station searches whether there are three vectors fed back from the mobile station to compose a matrix contained in a matrix set $P_3$, while this matrix is not a son matrix in the matrix set $W_4$. This can for example be achieved by searching recordation with the number of codebook vectors being 3 and the combination of codebook vectors to which the number of father combination indexes corresponds not being included in the set $W_4$ in the Table. Suppose there be $k_2$ matrixes represented as $W_3 = \{W_{3,1}, W_{3,2}, \ldots, W_{3,k_2}\}$, the corresponding maximum SINR is selected by the method identical with that used in the above 1).

3) The base station searches whether there are two vectors fed back from the mobile station to compose a matrix contained in a matrix set $P_2$, while this matrix is not a son matrix in the matrix sets $W_4$ and $W_3$. Suppose $k_3$ matrixes can be formed and represented as $W_2 = \{W_{2,1}, W_{2,2}, \ldots, W_{2,k_3}\}$, the corresponding maximum SINR is selected by the method identical with that used in the above 1).

4) The values of aforementioned three SINRs are compared to select the value of the maximum SINR and the matrix corresponding thereto. This matrix is taken as the pre-coding matrix after having been zero-forced, and the index corresponding to this matrix is transmitted to the downlink scheduled user.

Be noted, the aforementioned steps 1) through 3) correspond to the pre-coding matrix element selecting step according to the present invention. However, they can also be performed in a conventional method, but the use of the aforementioned method according to the present invention enhances the efficiency.

The embodiments of the present invention are described below.

Figure 3:
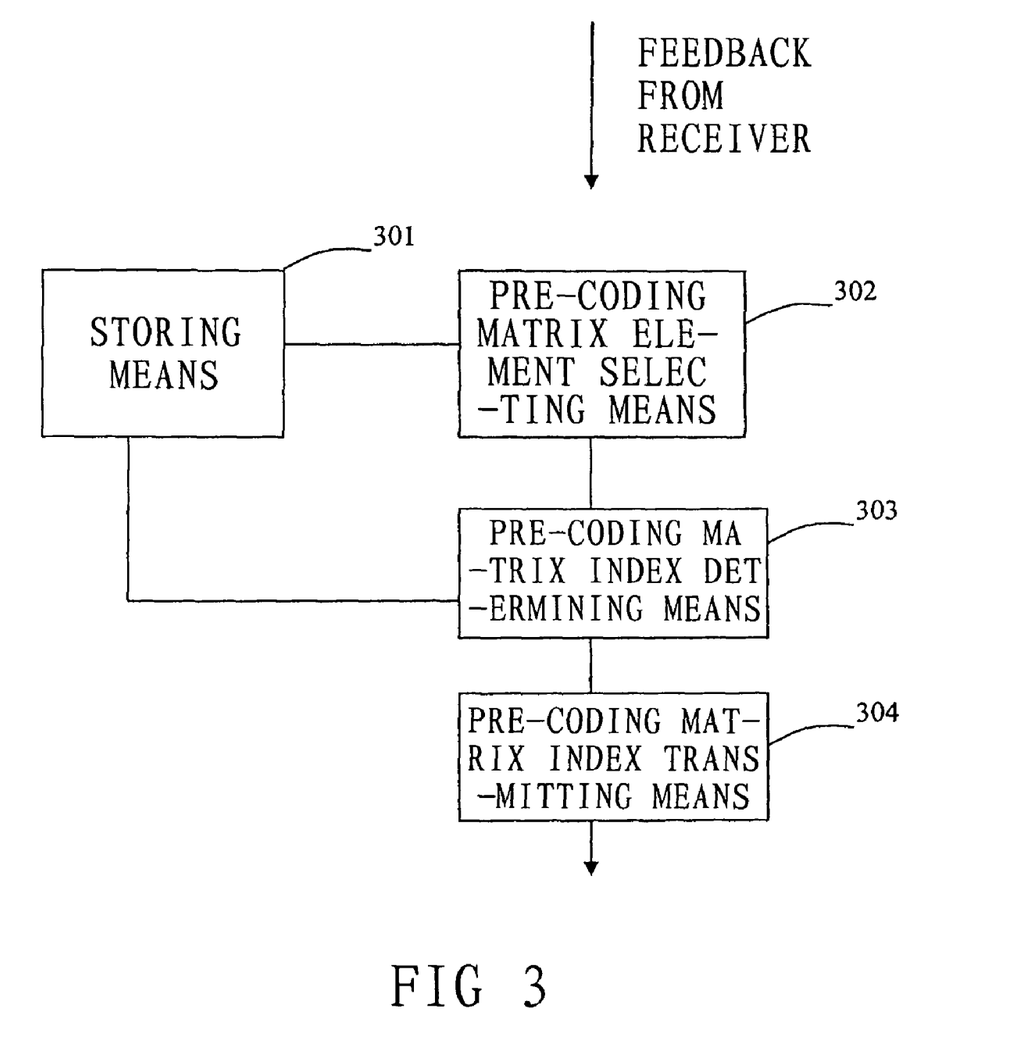
FIG. 3 is a block diagram illustrating a base station according to one embodiment of the present invention.

FIG. 3 is a block diagram illustrating a base station according to one embodiment of the present invention. As shown in FIG. 3, the base station according to the present invention comprises a storing means 301, a pre-coding matrix element selecting means 302, a pre-coding matrix index determining means 303 and a pre-coding matrix index transmitting means 304.

The storing means 301 stores codebook vector group information relevant to the combination of codebook vectors capable of being used as a pre-coding group, and the codebook vector group information includes an index of the combination of codebook vectors capable of being used as the pre-coding group. As noted above, the codebook vector group information can be in the form of a table (such as any one of Tables 1 to 3), in which are stored the combination of the codebook vectors capable of being used as the pre-coding group as well as the index of the combination. Elements in the table can be obtained via a trellis as designed, which includes a series of state transfer information and indexes that correspond to each series of the state transfer information. Each series of the state transfer information includes the combination of the codebook vectors capable of being used as the pre-coding group. Preferably, the codebook vector group information only includes the combinations of two or more codebook vectors whose correlation value therebetween is lower than a predetermined threshold value and which cannot be further combined with other codebook vectors.

As should be noted, the storing means according to the present invention should be explained in broad terms. The codebook vector group information can be stored in other information processing apparatus (such as a person computer, a PDA, etc.), storage means, another base station or mobile station directly connected to the base station or indirectly connected to the base station via a local network or the Internet. However, as long as the information on these other devices is made reference with, the devices relevant to such reference on the base station, such as the CPU, the memory or the relevant chips, should be regarded as the storing means. Moreover, when the trellis or table is calculated for each time, the CPU or memory involved in the calculation of the trellis or table should also be regarded as the storing means.

The pre-coding matrix element selecting means 302 selects codebook vectors to be taken as elements of a pre-coding matrix. This can be performed in a conventional method, or in the mode of referring to the codebook vector group information. The use of the mode of referring to the codebook vector group information can enhance speed and alleviate load associated with processing of the base station. The pre-coding matrix element selecting means 302 determines the codebook vectors to be taken as elements of the pre-coding matrix in accordance with one of a maximum rate rule, a fairness rule, a proportion fairness scheduling rule, a grouping scheduling rule, and a polling scheduling rule.

The pre-coding matrix index determining means 303 determines an index, to which a combination of the codebook vectors selected by the pre-coding matrix element selecting means corresponds, in accordance with the codebook vectors to be taken as elements of a pre-coding matrix as selected by the pre-coding matrix element selecting means and with reference to the codebook vector group information.

The pre-coding matrix index transmitting means 304 transmits the index of the combination of the codebook vectors determined by the pre-coding matrix index determining means. The index can be transmitted in the control channel via separate grouping or code elements.

The feedback information in FIG. 3 is for example the index of CQI value and quantization vector.

It is obvious that the apparatus according to the present invention merely transmits the index of the combination of the codebook vectors, while it is unnecessary to transmit each codebook vector or the index of each codebook vector. Since the total number of the combinations of the codebook vectors is relatively small, radio resources can be effectively saved thereby.

In addition, the trellis according to the present invention makes it possible to design the storage table to perform user group determination, thereby enhancing speed and strengthening responsiveness of the base station.

Figure 4:
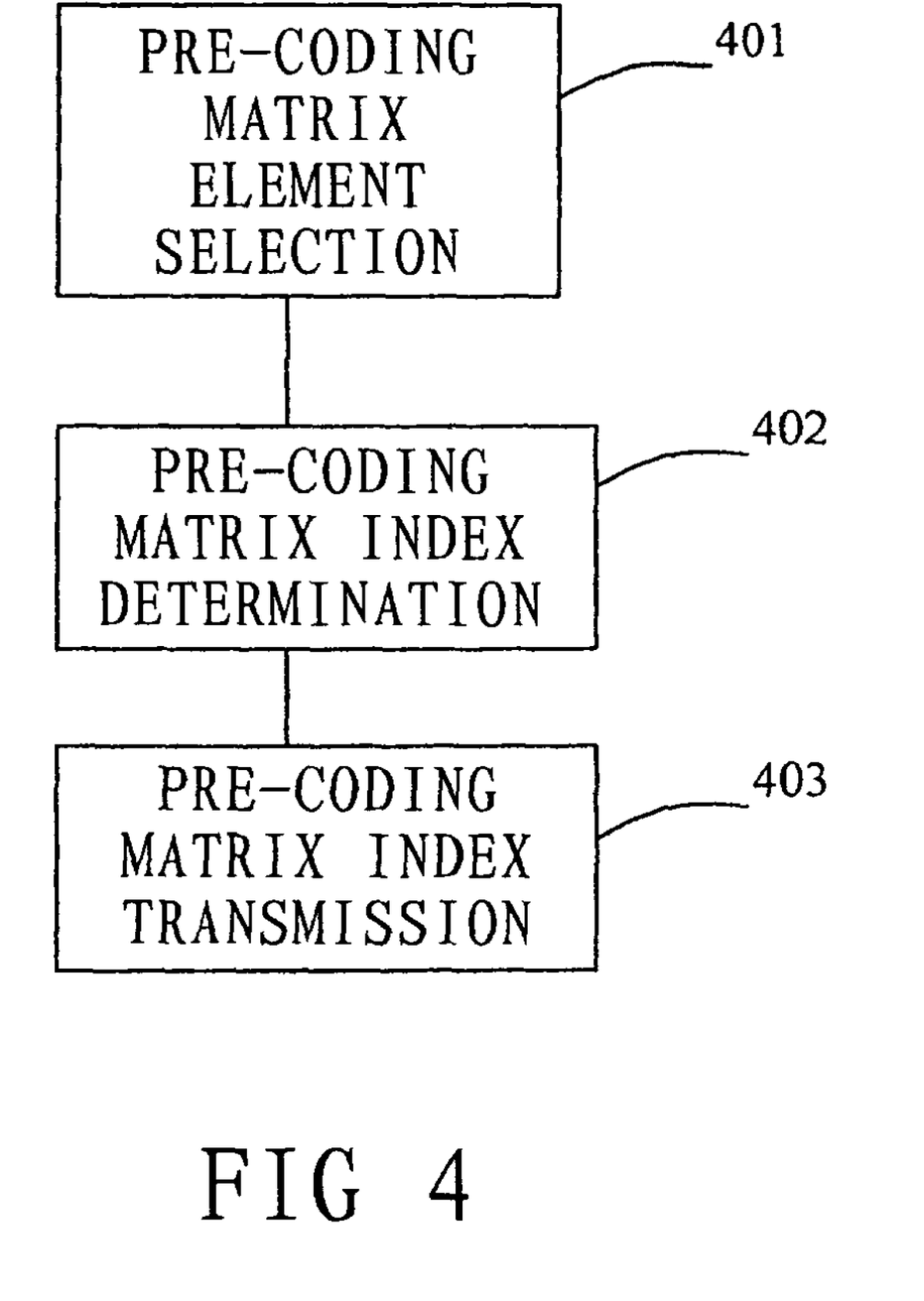
FIG. 4 is a block diagram illustrating a base station scheduling method according to one embodiment of the present invention.

FIG. 4 is a block diagram illustrating a base station scheduling method according to one embodiment of the present invention. As shown in FIG. 4, the base station scheduling method according to the present invention comprises a pre-coding matrix element selecting step 401, a pre-coding matrix index determining step 402 and a pre-coding matrix index transmitting step 403.

The pre-coding matrix element selecting step 401 is for selecting codebook vectors to be taken as elements of a pre-coding matrix. This can be performed in a conventional method, or in the mode of referring to the codebook vector group information in the storing means 301. The use of the mode of referring to the codebook vector group information can enhance speed and alleviate load associated with processing of the base station. In the pre-coding matrix element selecting step 401, the base station determines the codebook vectors to be taken as elements of the pre-coding matrix in accordance with one of a maximum rate rule, a fairness rule, a proportion fairness scheduling rule, a grouping scheduling rule, and a polling scheduling rule.

In the pre-coding matrix index determining step 402, the base station determines an index, to which a combination of the codebook vectors selected in the pre-coding matrix element selecting step corresponds, in accordance with the codebook vectors to be taken as elements of a pre-coding matrix as selected in the pre-coding matrix element selecting step and with reference to the codebook vector group information in the storing means 301.

The pre-coding matrix index transmitting step 403 is for transmitting the index of the combination of the codebook vectors determined in the pre-coding matrix index determining step.

The method according to the present invention merely transmits the index of the combination of the codebook vectors, while it is unnecessary to transmit each codebook vector or the index of each codebook vector. Since the total number of the combinations of the codebook vectors is relatively small, radio resources can be effectively saved thereby.

In addition, the trellis according to the present invention makes it possible to design the storage table to perform user group determination, thereby enhancing speed and strengthening responsiveness of the base station.

Although the embodiments of the present invention have been described above, these embodiments are merely specific modes of execution of the present invention, while the present invention is not specifically restricted thereto, and it is possible to adequately change the design of the particular configuration of each device. The advantages as described in the embodiments of the present invention are merely examples of adequate advantages achievable by the present invention, and the present invention is hence not restricted to these advantages.

The above description to the present invention concentrates on the unique features of the present invention for the sake of easier comprehension. The present invention is not restricted to the specific embodiments as described in detail herein but can be applied in other embodiments, and the present invention is also applicable in various fields of application. Terms and expressions employed in the present Description are not used to restrict explanations of the present invention, but are directed to exact illustration of the present invention. As should be understood, it would be easy for a person skilled in the art to deduce, from the principles of the present invention as described in the Description, different configurations, systems or methods that pertain to the principles of the present invention. It should be accordingly regarded that the description of the claims subsumes equivalent configurations without departing from the principles and scopes of the present invention. The objective of the specific embodiments or examples aims to enable the Patent Office, common public organizations or persons skilled in the technical field of this invention but unfamiliar with patent, legal and professional terms to acquire the technical contents and substances of the present invention by way of simple analysis and in an easy manner. Accordingly, the specific embodiments or examples are not directed to restricting the scopes of the present invention that should be determined by the claims. The documents as disclosed should be entirely referred to, so as to have a full comprehension of the objectives and unique features of the present invention.

The invention claimed is:

1. A base station which utilizes a multi-user multi-input and multi-output (MIMO) method, comprising:
    a storing means, for storing codebook vector group information relevant to a combination of codebook vectors configured to be used as a pre-coding group, the codebook vector group information comprising an index of the combination of codebook vectors configured to be used as a pre-coding group;
    a pre-coding matrix element selecting means, for selecting codebook vectors to be taken as elements of a pre-coding matrix;
    a pre-coding matrix index determining means, for determining an index, to which a combination of the codebook vectors selected by the pre-coding matrix element selecting means corresponds, in accordance with the codebook vectors to be taken as elements of a pre-coding matrix as selected by the pre-coding matrix element selecting means and with reference to the codebook vector group information; and a pre-coding matrix index transmitting means, for transmitting the index of the combination of the codebook vectors determined by the pre-coding matrix index determining means.

2. The base station according to claim 1, wherein the codebook vector group information is a table, which correspondingly stores the combination of codebook vectors configured to be used as a pre-coding group and the index of the combination.

3. The base station according to claim 1, wherein the codebook vector group information is an optional user group trellis, which comprises plural series of state transition information and indexes corresponding, respectively, to the state transition information of each series, the state transition information of each series including the combination of codebook vectors configured to be used as a pre-coding group.

4. The base station according to claim 1, wherein the pre-coding matrix element selecting means determines the codebook vectors to be taken as elements of pre-coding matrix in accordance with the codebook vector group information.

5. The base station according to claim 1, wherein the pre-coding matrix element selecting means determines the codebook vectors to be taken as elements of a pre-coding matrix in accordance with one of a maximum rate rule, a fairness rule, a proportion fairness scheduling rule, a grouping scheduling rule, and a polling scheduling rule.

6. The base station according to claim 1, wherein the combination of codebook vectors configured to be used as a pre-coding group is a combination of two or more codebook vectors whose correlation value therebetween is lower than a predetermined threshold value.

7. The base station according to claim 1, wherein the combination of codebook vectors configured to be used as a pre-coding group is a combination of two or more codebook vectors whose correlation value therebetween is lower than a predetermined threshold value and which cannot be further combined with other codebook vectors.

8. A scheduling method for use in a base station which utilizes a multi-user multi-input and multi-output (MIMO) method, comprising:

a pre-coding matrix element selecting step, for selecting codebook vectors to be taken as elements of a pre-coding matrix;

a pre-coding matrix index determining step, for determining an index, to which a combination of the codebook vectors selected in the pre-coding matrix element selecting step corresponds, in accordance with the codebook vectors to be taken as elements of a pre-coding matrix as selected in the pre-coding matrix element selecting step and with reference to codebook vector group information, wherein the codebook vector group information is stored in a storing means of the multi-user MIMO base station, relates to the combination of the codebook vectors configured to be used as a pre-coding group, and includes the index of the combination of the codebook vectors configured to be used as a pre-coding group; and a pre-coding matrix index transmitting step, for transmitting the index of the combination of the codebook vectors determined in the pre-coding matrix index determining step.

9. The method according to claim 8, wherein the codebook vector group information is a table, which correspondingly stores the combination of codebook vectors configured to be used as a pre-coding group and the index of the combination.

10. The method according to claim 8, wherein the pre-coding matrix element selecting step determines the codebook vectors to be taken as elements of a pre-coding matrix in accordance with the codebook vector group information.

\* \* \* \* \*